(12) United States Patent
Yamamoto

(10) Patent No.: US 11,514,876 B2
(45) Date of Patent: Nov. 29, 2022

(54) LEARNING MODEL GENERATION METHOD, LEARNING MODEL GENERATION DEVICE, AND AUTOMATIC MUSICAL PERFORMANCE ROBOT

(71) Applicant: YAMAHA CORPORATION, Hamamatsu (JP)

(72) Inventor: Kazuhiko Yamamoto, Hamamatsu (JP)

(73) Assignee: YAMAHA CORPORATION, Shizuoka (JP)

( * ) Notice: Subject to any disclaimer, the term of this patent is extended or adjusted under 35 U.S.C. 154(b) by 350 days.

(21) Appl. No.: 16/778,399

(22) Filed: Jan. 31, 2020

(65) Prior Publication Data

US 2020/0168186 A1 May 28, 2020

Related U.S. Application Data

(63) Continuation of application No. PCT/JP2018/028014, filed on Jul. 26, 2018.

(30) Foreign Application Priority Data

Aug. 2, 2017 (JP) .............................. JP2017-150225

(51) Int. Cl.
*G10F 1/08* (2006.01)
*G06N 20/00* (2019.01)
*G06N 5/04* (2006.01)
*G10H 1/00* (2006.01)
*G06N 3/04* (2006.01)

(52) U.S. Cl.
CPC ................. *G10F 1/08* (2013.01); *G06N 5/04* (2013.01); *G06N 20/00* (2019.01); *G10H 1/0008* (2013.01); *G06N 3/04* (2013.01); *G10H 2210/091* (2013.01); *G10H 2250/311* (2013.01)

(58) Field of Classification Search
CPC . G10F 1/08; G06N 20/00; G06N 5/04; G06N 3/04; G10H 1/0008; G10H 2210/091; G10H 2250/311
See application file for complete search history.

(56) References Cited

U.S. PATENT DOCUMENTS

2007/0221035 A1\* 9/2007 Muramatsu ............... G10F 1/02 84/13

FOREIGN PATENT DOCUMENTS

| CN | 101042861 A | 9/2007 | |
|---|---|---|---|
| DE | 202006020190 U1 \* | 6/2008 | ............... G10F 1/08 |
| EP | 1837856 A1 | 9/2007 | |

(Continued)

OTHER PUBLICATIONS

International Search Report and Written Opinion of PCT Application No. PCT/JP2018/028014, dated Oct. 9, 2018, 8 pages of ISRWO.

*Primary Examiner* — Jianchun Qin
(74) *Attorney, Agent, or Firm* — Chip Law Group

(57) ABSTRACT

Disclosed is a learning model generation method executed by a computer, including: striking a percussion instrument with a striking member to emit a musical sound; and conducting machine learning upon receiving an input of the musical sound emitted from the percussion instrument, and generating, based on the machine learning, a learning model for outputting numerical values for setting musical performance parameters for an automatic musical performance of the percussion instrument that is struck when the striking member is driven.

9 Claims, 3 Drawing Sheets

(56) References Cited

FOREIGN PATENT DOCUMENTS

| JP | 07-319456 A | 12/1995 |
|---|---|---|
| JP | 07-319457 A | 12/1995 |
| JP | 2007-256538 A | 10/2007 |
| JP | 2008-026724 A | 2/2008 |
| JP | 2008-207299 A | 9/2008 |
| JP | 2016-114717 A | 6/2016 |

* cited by examiner

LEARNING MODEL GENERATION METHOD, LEARNING MODEL GENERATION DEVICE, AND AUTOMATIC MUSICAL PERFORMANCE ROBOT

CROSS-REFERENCE TO RELATED APPLICATIONS

This application is a continuation application of International Application No. PCT/JP2018/028014, filed on Jul. 26, 2018, which claims priority to Japanese Patent Application No. 2017-150225 filed in Japan on Aug. 2, 2017. The entire disclosures of International Application No. PCT/JP2018/028014 and Japanese Patent Application No. 2017-150225 are hereby incorporated herein by reference.

BACKGROUND

The present disclosure relates to an automatic musical performance of a percussion instrument.

Musical performance control technologies for allowing a musical performance robot to automatically play percussion instruments and various other musical instruments have been proposed in the related art. Disclosed, for example, in Japanese Patent Laid-open No. 2008-026724 is a drum playing device that strikes a percussion instrument by moving a stick with a plurality of actuators in accordance with music data descriptive of a musical composition.

SUMMARY

However, it is difficult to present an aurally natural automatic musical performance simply by moving a stick in accordance with music data as described in Japanese Patent Laid-open No. 2008-026724. In view of the above circumstances, a preferred mode of the present disclosure is directed to present a natural automatic musical performance of a percussion instrument.

According to a preferred mode of the present disclosure for solving the above-mentioned problem, there is provided a learning model generation method. The learning model generation method causes a computer to conduct machine learning upon receiving an input of the musical sound emitted from the percussion instrument, and generate, based on the machine learning, a learning model for outputting numerical values for setting musical performance parameters for an automatic musical performance of the percussion instrument that is struck when the striking member is driven.

According to another preferred mode of the present disclosure, there is provided a learning model generation device. The learning model generation device conducts machine learning upon receiving an input of the musical sound emitted from the percussion instrument, and generates, based on the machine learning, a learning model for outputting numerical values for setting musical performance parameters for an automatic musical performance of the percussion instrument that is struck when the striking member is driven.

According to yet another preferred mode of the present disclosure, there is provided a program that causes a computer to function as a learning processing section. The learning processing section conducts machine learning upon receiving an input of the musical sound emitted from the percussion instrument, and generates, based on the machine learning, a learning model for outputting numerical values for setting musical performance parameters for an automatic musical performance of the percussion instrument that is struck when the striking member is driven.

DETAILED DESCRIPTION OF THE PREFERRED EMBODIMENTS

First Embodiment

Figure 1:
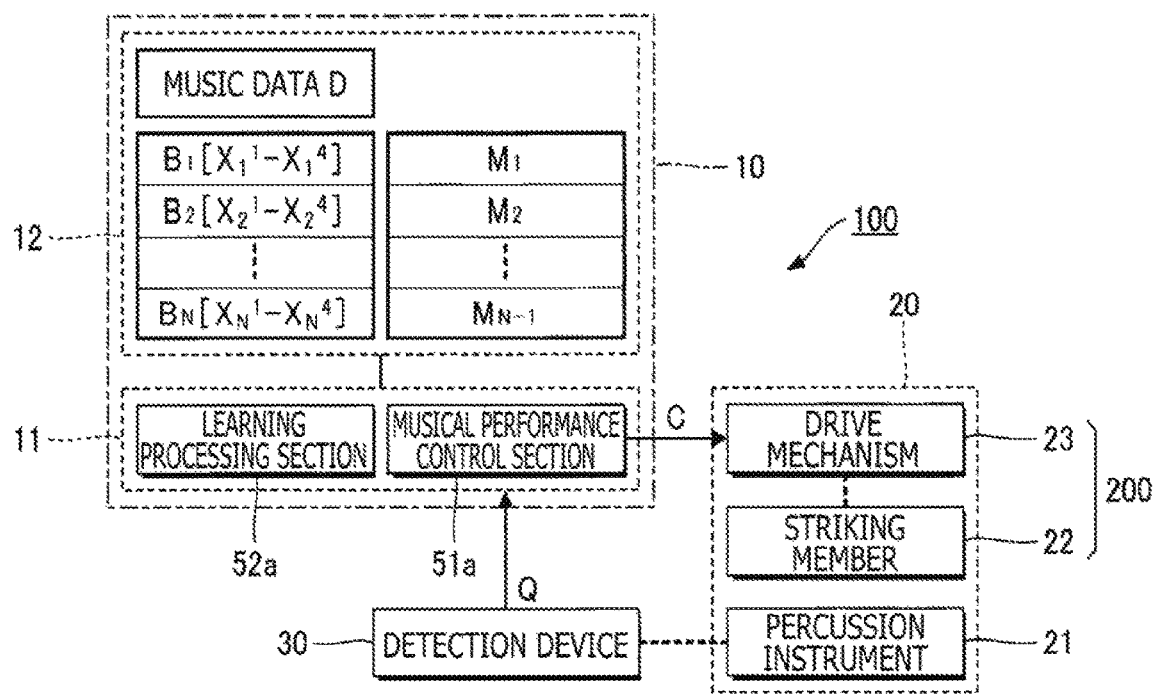
FIG. 1 is a block diagram illustrating a configuration of an automatic musical performance system according to a first embodiment of the present disclosure.

FIG. 1 is a diagram illustrating a configuration of an automatic musical performance system 100 according to a first embodiment of the present disclosure. The automatic musical performance system 100 is a computer system automatically playing a percussion instrument 21, and includes a musical performance control device 10, a musical performance device 20, and a detection device 30. Two or more elements of the automatic musical performance system 100 may be integrated with each other. For example, the musical performance device 20 and the detection device 30 may be integrated with each other.

Figure 2:
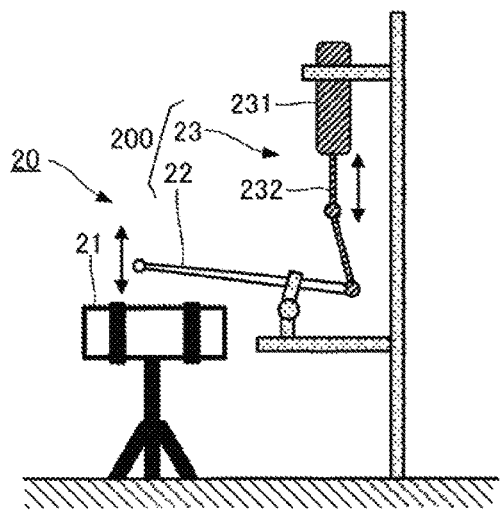
FIG. 2 is a schematic diagram illustrating a configuration of a musical performance device (automatic musical performance robot)

The musical performance device 20 automatically plays a musical composition under control of the musical performance control device 10. As illustrated in FIG. 1, the musical performance device 20 in the first embodiment includes the percussion instrument 21, a striking member 22, and a drive mechanism 23. FIG. 2 is a schematic diagram illustrating a detailed configuration of the musical performance device 20. As illustrated in FIG. 2, the percussion instrument 21 is an instrument that emits a sound when struck (e.g., a membranophone or an idiophone), and typically is a drum or another membranophone. The striking member 22 is a member used to strike the percussion instrument 21, and typically is a stick for striking a drum.

The drive mechanism 23 automatically plays the percussion instrument 21 by moving or rotating the striking member 22 to strike the percussion instrument 21. The drive mechanism 23 includes, for example, various actuators such as an electric motor or a solenoid. As illustrated in FIG. 2, the drive mechanism 23 in the first embodiment includes a piston mechanism 231 and a link mechanism (a plurality of arms and a joint for coupling the arms) 232. The piston mechanism 231 reciprocates. The link mechanism 232 transmits the motion of the piston mechanism 231 to the striking member 22. When a base end of the striking member 22 is coupled to the link mechanism 232 in the drive mechanism 23, the motion of the piston mechanism 231 is transmitted to the striking member 22. The detailed configuration of the drive mechanism 23 is not limited to that illustrated in FIG. 2. The striking member 22 and the drive mechanism 23 function as an automatic musical performance robot 200 that automatically plays the percussion instrument 21.

Figure 3:
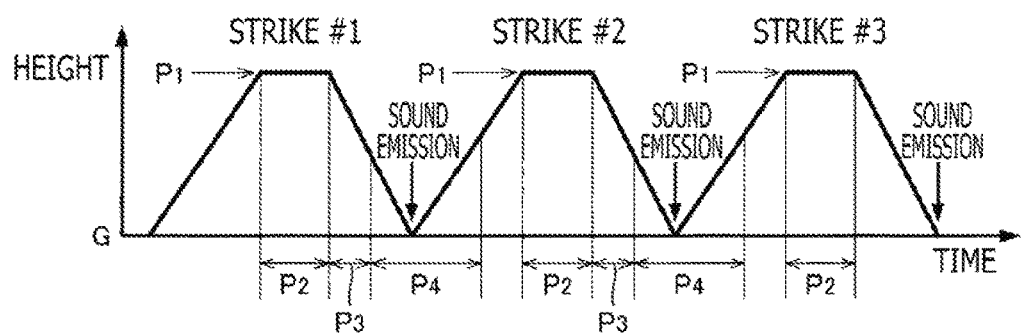
FIG. 3 is a diagram illustrating an operation that is conducted by a striking member to strike a percussion instrument.

FIG. 3 is a diagram illustrating an operation of the drive mechanism 23. More specifically, FIG. 3 depicts temporal changes in the position of a tip of the striking member 22 that strikes the percussion instrument 21. The vertical axis of FIG. 3 represents the height of the tip of the striking member 22 from a striking surface of the percussion instrument 21 (e.g., a vibrating membrane) that is struck by the striking member 22. As illustrated in FIG. 3, the position of the tip of the striking member 22 changes each time the striking member 22 strikes the percussion instrument 21 (at each stroke of the striking member 22).

The drive mechanism 23 moves the tip of the striking member 22 from a reference position G to a start position P1. The reference position G is the position of the striking surface of the percussion instrument 21, and the start position P1 is the position apart from the striking surface. The drive mechanism 23 lowers the tip by driving the striking member 22 for a driving period P3. The driving period P3 begins when a standby period P2 elapses from a time point at which the tip reaches the start position P1. Stated differently, the driving period P3 is a period of time during which a driving force from the drive mechanism 23 is applied to the striking member 22. When the driving period P3 elapses, the driving force from the drive mechanism 23 is canceled. However, the striking member 22 drops to the reference position G due to self-weight and inertia force, then hits the striking surface of the percussion instrument 21, and rebounds from the striking surface. A release period P4 depicted in FIG. 3 is a period of time during which the driving force from the drive mechanism 23 is not applied to the striking member 22. When the release period P4 elapses, the drive mechanism 23 moves the tip of the striking member 22 to the start position P1 at a predetermined speed. The above-described operation is conducted for each strike.

The time point and the intensity of striking by the striking member 22 are prescribed by the numerical values of a plurality of aforementioned musical performance parameters P (start position P1, standby period P2, driving period P3, and release period P4). For example, the intensity of striking is prescribed in accordance with the start position P1 and the driving period P3, and the time point of striking is prescribed in accordance with the standby period P2 and the release period P4. The musical performance control device 10 depicted in FIG. 1 causes the musical performance device 20 to automatically play music by supplying a control signal C that specifies the plurality of musical performance parameters P.

The detection device 30 depicted in FIG. 1 detects a musical sound that is emitted from the percussion instrument 21 when it is struck by the striking member 22. The detection device 30 outputs an observed signal Q that indicates the musical sound of the percussion instrument 21. The detection device 30 in the first embodiment is a vibration detector for detecting a vibration (i.e., musical sound) that is generated on the striking surface of the percussion instrument 21 when it is struck by the striking member 22. For example, a piezoelectric element mounted on the striking surface of the percussion instrument 21 is preferably used as the detection device 30. Alternatively, a sound collector for collecting a musical sound emitted into space from the percussion instrument 21 may be used as the detection device 30. An A/D converter for converting an analog observed signal Q to its digital equivalent is not depicted in the drawings.

As illustrated in FIG. 1, the musical performance control device 10 is implemented by a computer system that includes a control device 11 and a storage device 12. For example, a personal computer or another information terminal is used as the musical performance control device 10. The control device 11 includes, for example, a central processing unit (CPU) or other processing circuits. The storage device 12 stores a program to be executed by the control device 11 and various data to be used by the control device 11. For example, a semiconductor recording medium, a well-known recording medium such as a magnetic recording medium, or a combination of different types of recording media is used as appropriate as the storage device 12. The musical performance control device 10 may alternatively be implemented by a plurality of separately configured devices.

The storage device 12 in the first embodiment stores music data D descriptive of a musical composition. The music data D in the first embodiment specifies the time point (timing) and the intensity of striking regarding each of a plurality of music notes for a percussion part of the musical composition. A preferred example of the music data D is a standard musical instrument digital interface (MIDI) file (SMF) that is in compliant with MIDI and formed by chronologically arranging instruction data and time data. The instruction data issues an instruction for sound emission by specifying the intensity. The time data specifies the time point of sound emission indicated by the individual instruction data.

Further, the storage device 12 in the first embodiment stores basic data Bn (n=1 to N) about each of a plurality of music notes (N music notes) for the percussion part of the musical composition. Each piece of the basic data Bn prescribes the intensity and the time point of striking regarding the nth music note for the percussion part. More specifically, the basic data Bn specifies basic values Xnk (Xn1, Xn2, Xn3, and Xn4) for each of the plurality of musical performance parameters P (k=1 to 4). Stated differently, the basic data Bn includes the basic values Xnk for the nth music note for the percussion part, namely, the basic value Xn1 for the start position P1, the basic value Xn2 for the standby period P2, the basic value Xn3 for the driving period P3, and the basic value Xn4 for the release period P4. Each of the basic values Xnk is an initial value of each musical performance parameter P that prescribes the striking for emitting a sound based on the nth music note for the percussion part. For example, each of the basic values Xnk is set to a numerical value specified by a user of the automatic musical performance system 100.

As illustrated in FIG. 1, the control device 11 in the first embodiment executes the program stored in the storage device 12 to thereby function as a plurality of elements (a musical performance control section 51a and a learning processing section 52a) for controlling the musical performance device 20. Some of the functions of the control device 11 may be implemented by dedicated electronic circuits.

The musical performance control section 51a controls an automatic musical performance operation that is conducted by the musical performance device 20. More specifically, the musical performance control section 51a causes the musical performance device 20 to automatically play a musical composition by supplying the control signal C to control the drive mechanism 23 in such a manner as to drive the striking member 22.

Figure 4:
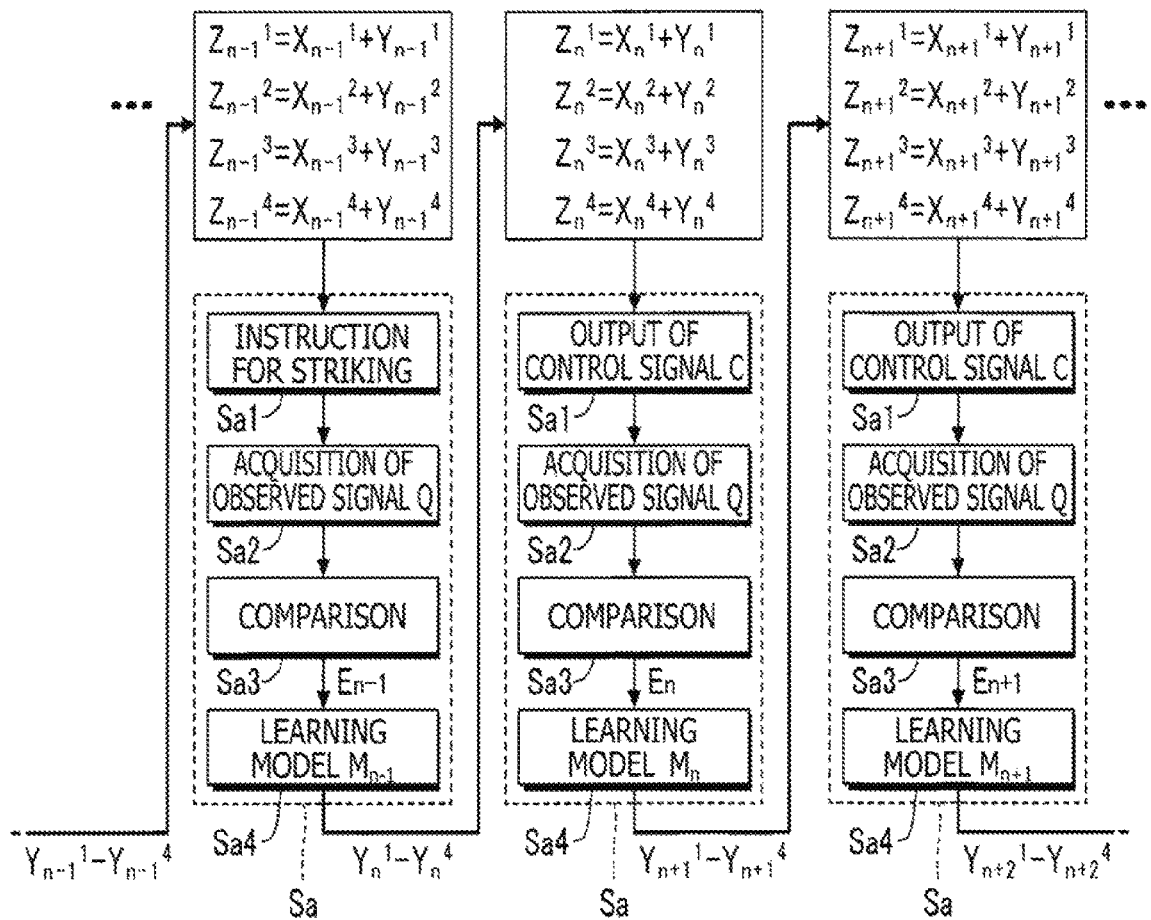
FIG. 4 is a diagram illustrating an operation of a musical performance control section.

FIG. 4 is a diagram illustrating an operation of the musical performance control section 51a. As illustrated in FIG. 4, for each of N music notes for the percussion part, the musical performance control section 51a instructs the drive mechanism 23 in the musical performance device 20 to conduct a striking operation prescribed by instruction values Znk (Zn1, Zn2, Zn3, and Zn4) of each musical performance parameter P (step Sa1). The instruction value Zn1 is a numerical value for the start position P1, the instruction value Zn2 is a numerical value for the standby period P2, the instruction value Zn3 is a numerical value for the driving period P3, and the instruction value Zn4 is a numerical value for the release period P4. Stated differently, as regards a striking operation for emitting a sound based on the nth music note in a musical composition, the musical performance control section 51a controls the drive mechanism 23 in such a manner as to match the start position P1 to the instruction value Zn1, match the standby period P2 to the instruction value Zn2, match the driving period P3 to the instruction value Zn3, and match the release period P4 to the instruction value Zn4.

The instruction value Znk for the nth music note in a musical composition is set to a numerical value that is based on the basic value Xnk and an adjustment value Ynk. Specifically, the instruction value Znk is a value obtained by adding the basic value Xnk to the adjustment value Ynk (Znk=Xnk+Ynk). As mentioned earlier, the basic value Xnk is a numerical value included in the basic data Bn pre-stored in the storage device 12. Meanwhile, the adjustment value Ynk for the nth music note is a numerical value for adjusting the basic value Xnk, and set based on a musical sound that is actually emitted according to the immediately preceding (n−1)th music note in compliance with the instruction values Zn−11 to Zn−14.

As illustrated in FIG. 4, let us assume a case where, for example, a musical sound is emitted in accordance with the (n−1)th music note in a musical composition when the musical performance control section 51a controls the drive mechanism 23 in accordance with the instruction values Zn−11 to Zn−14 (step Sa1). The musical performance control section 51a acquires an observed signal Q based on the musical sound of the percussion instrument 21 from the detection device 30 (step Sa2). The musical performance control section 51a compares the time point and the intensity of the musical sound identified by the observed signal Q with the time point and the intensity specified for the (n−1)th music note by the music data D, and generates an error En−1 indicative of the difference between the compared time points and intensities (step Sa3). An alternative is to generate the error En−1 that indicates the difference between the frequency spectrum of a musical sound indicated by the observed signal Q and the frequency spectrum of a musical sound specified by the music data D.

The musical performance control section 51a generates adjustment values Ynk (Yn1 to Yn4) for the nth music note by giving the error En−1 to a learning model Mn−1 (step Sa4). Stated differently, the learning model Mn−1 is a mathematical model for outputting the adjustment values Ynk (Yn1 to Yn4) that adjust the individual basic values Xnk of the musical performance parameters P for the nth music note with respect to the error En−1 in a musical sound corresponding to the (n−1)th music note. The learning model Mn−1 is implemented as a program included as a part of artificial intelligence software, and defined by combining a neural network having a predetermined configuration with a group of factors w set by machine learning (more specifically, deep learning). The group of factors w is a set of a plurality of weighting factors applied to be the neural network. As illustrated in FIG. 1, the storage device 12 stores (N−1) learning models M1 to MN−1 that are associated with different music notes in a musical composition. As described earlier, for each of the second to Nth (N−1) music notes, the adjustment values Ynk (Zn1, Zn2, Zn3, and Zn4) are set by applying the error En−1 concerning a musical sound based on the immediately preceding ((n−1)th) music note to the learning model Mn−1. As is understandable from FIG. 4, the adjustment values Ynk are sequentially set in the order of a plurality of music notes in a musical composition. A process executed in steps Sa1 to Sa4 is hereinafter referred to as the "musical performance control process Sa." The musical performance control process Sa is executed to set the adjustment values Yn1 to Yn4 by controlling the drive mechanism 23 in accordance with the instruction values Zn−11 to Zn−14 so as to let the percussion instrument 21 emit a sound and giving the error En−1 concerning a musical sound of the percussion instrument 21 to the learning model Mn−1. As is understandable from the above description, the automatic musical performance robot 200 according to the first embodiment automatically plays the percussion instrument 21 by using the musical performance parameters P (adjustment values Yn1 to Yn4) outputted from each learning model Mn.

The learning processing section 52a depicted in FIG. 1 generates, by conducting machine learning, (N−1) learning models M1 to MN−1 that are associated with different music notes for the percussion part. More specifically, the learning processing section 52a sets the group of factors w for each learning model Mn. The learning processing section 52a in the first embodiment updates the group of factors w for each learning model Mn repeatedly a plurality of times in such a manner as to reduce (ideally, minimize) the error En generated by the musical performance control section 51a in the musical performance control process Sa. As is understandable from the above description, the musical performance control device 10 in the first embodiment functions as a learning model generation device that conducts machine learning to generate the learning models Mn.

The operation of the musical performance control device 10 is divided into a preparation phase and an actual playing phase. The actual playing phase is a phase where, for example, a musical composition is automatically played by using the automatic musical performance system 100 and actually listened to by an audience (i.e., actual musical performance). Meanwhile, the preparation phase is a phase (a so-called rehearsal) where machine learning is conducted to generate (N−1) learning models M1 to MN−1 prior to the actual playing phase. The preparation phase and the actual playing phase are in the same environment where the automatic musical performance system 100 is installed.

Figure 5:
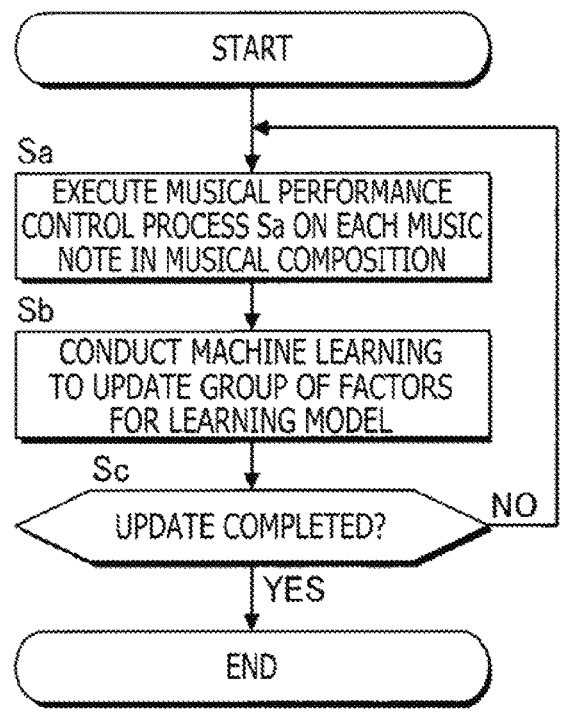
FIG. 5 is a flowchart illustrating an operation conducted by a control device.

FIG. 5 is a flowchart illustrating a process (an example of a learning model generation method) that is executed in the preparation phase by the control device 11. The process depicted in FIG. 5 starts when, for example, an instruction is issued from the user. When the process starts, the musical performance control section 51a repeatedly executes the above-described musical performance control process Sa on a plurality of music notes for the percussion part of a musical composition. In the musical performance control process Sa on the (n−1) music note, the musical performance control section 51a sets the adjustment values Yn1 to Yn4 by controlling the drive mechanism 23 in accordance with the instruction values Zn−11 to Zn−14 so as to let the percussion instrument 21 emit a sound and giving the error En−1 concerning the musical sound of the percussion instrument 21 to the learning model Mn−1. In other words, errors E1 to EN−1 in the musical sound are generated in parallel with automatic playing of the musical composition by the percussion part.

The learning processing section 52a updates the group of factors w for each of (N−1) learning models M1 to MN−1 in such a manner as to reduce the errors E1 to EN−1 generated in the musical performance control process Sa (step Sb). In other words, the group of factors w for each learning model Mn is updated by machine learning that is conducted by using a musical sound actually emitted from the percussion instrument 21.

When the group of factors w for each learning model Mn is updated, the learning processing section 52a determines whether or not the musical performance control process Sa and machine learning Sb are repeated a predetermined number of times (step Sc). If the number of repetitions is smaller than the predetermined number ("NO" in step Sc), the musical performance control process Sa and the machine learning Sb are repeated. In this instance, the musical performance control process Sa uses each of the most recently updated learning models Mn, and the machine learning Sb inputs a musical sound derived from the musical performance control process Sa. As the machine learning Sb is repeated to update the group of factors w for each learning model Mn, the errors E1 to EN−1 in the musical sound is gradually reduced so that an automatic musical performance of the musical performance device 20, which is presented by the musical performance control process Sa, becomes close to aurally natural musical performance. In other words, the quality of automatic musical performance improves with time. When the musical performance control process Sa and the machine learning Sb are repeated the predetermined number of times ("YES" in step Sc), the process depicted in FIG. 5 is completed. Each of the above-described updated learning models Mn is stored in the storage device 12 as a final version of a learned model. The condition for terminating the machine learning Sb is not limited to the above-described one (the condition that the machine learning Sb is repeated the predetermined number of times).

In the actual playing phase subsequent to the preparation phase, each learning model Mn generated in the preparation phase is used to execute the musical performance control process Sa to thereby automatically play the percussion part of a musical composition. In the actual playing phase, the learning processing section 52a does not conduct the machine learning Sb (the update of the group of factors w).

Noise (e.g., an environmental sound such as an operating sound of air conditioning equipment) dependent on the environment where the automatic musical performance system 100 is installed may be superimposed on the observed signal Q. The noise in the observed signal Q is reflected in the error En in the musical sound. In the first embodiment, the learning models Mn are generated in such a manner as to reduce the error En. Therefore, appropriate adjustment values Yn1 to Yn4 can be set so as to reduce the influence of noise that is superimposed on a musical sound in the environment where the automatic musical performance system 100 is installed. As explained above, the first embodiment provides an advantage that makes it possible to present aurally natural automatic musical performance irrespective of changes in the environment where the automatic musical performance system 100 is installed.

As described above, the first embodiment generates the learning models Mn by conducting machine learning upon receiving the input of a musical sound that is emitted from the percussion instrument 21 when it is struck by the striking member 22. Using the learning models Mn makes it possible to present a natural automatic musical performance of the percussion instrument 21 as compared to a case where the adopted configuration simply moves the striking member 22 in accordance with the music data D.

Second Embodiment

A second embodiment of the present disclosure will now be described. Elements that are described in conjunction with embodiments illustrated below and adapted to operate or function in a similar manner to those described in conjunction with the first embodiment are designated by the same reference numerals as their counterparts in the first embodiment and will not be redundantly described in detail.

Figure 6:
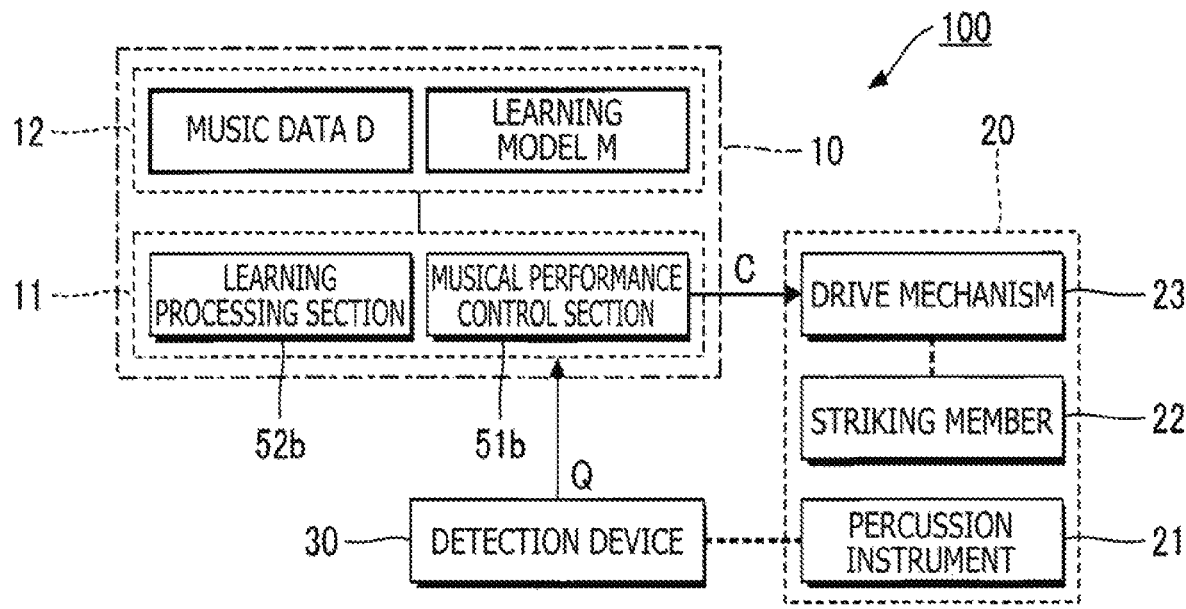
FIG. 6 is a block diagram illustrating a configuration of the automatic musical performance system according to a second embodiment.

FIG. 6 is a diagram illustrating a configuration of the automatic musical performance system 100 according to the second embodiment. As illustrated in FIG. 6, the automatic musical performance system 100 according to the second embodiment includes the musical performance control device 10, the musical performance device 20, and the detection device 30. The musical performance device 20 and the detection device 30 have a similar configuration to those in the first embodiment. The musical performance control device 10 includes the control device 11 and the storage device 12 as is the case with the first embodiment. The control device 11 executes the program stored in the storage device 12 to function as a plurality of elements (a musical performance control section 51b and a learning processing section 52b) for controlling the musical performance device 20.

The learning processing section 52b in the second embodiment generates a learning model M by conducting machine learning (more specifically, reinforcement learning) upon receiving the input of a musical sound emitted from the percussion instrument 21. The learning model M is a mathematical model for generating a time series of instruction values for each of a plurality of musical performance parameters P (start position P1, standby period P2, driving period P3, and release period P4). As is the case with the learning model Mn in the first embodiment, the learning model M in the second embodiment is defined by combining a neural network having a predetermined configuration with a group of factors w. The musical performance control section 51b generates the control signal C from the time series of the instruction values for each musical performance parameter P generated by the learning processing section 52b, and supplies the generated control signal C to the drive mechanism 23 to thereby allow the musical performance device 20 to automatically play a musical composition. It is understandable from the above description that the automatic musical performance robot 200 according to the second embodiment also automatically plays the percussion instrument 21 by using the musical performance parameters P outputted from the learning model M, as is the case with the first embodiment.

Figure 7:
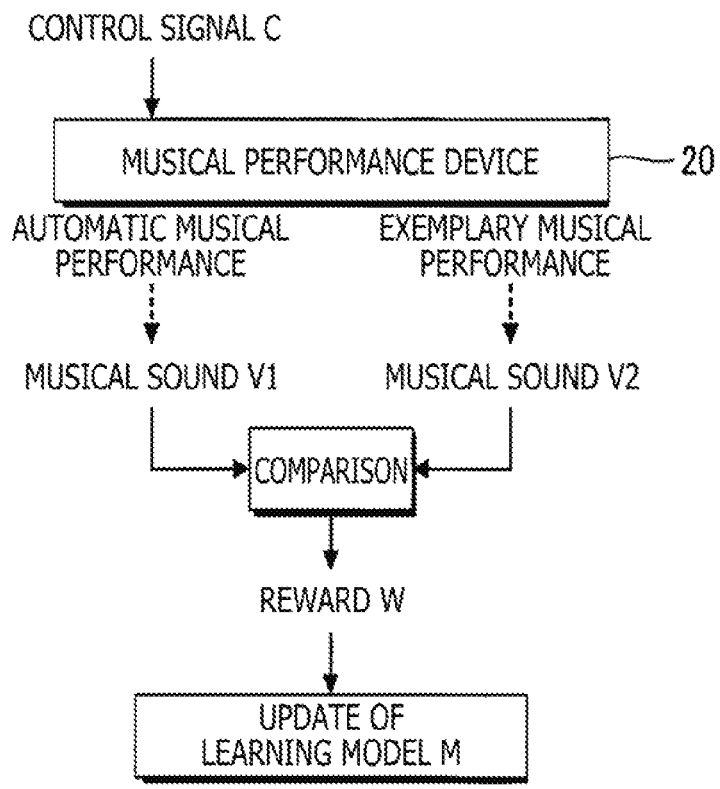
FIG. 7 is a diagram illustrating machine learning in the second embodiment.

FIG. 7 is a diagram illustrating an operation of the learning processing section 52b. Machine learning conducted by the learning processing section 52b in the second embodiment is reinforcement learning that is conducted to maximize a reward W. The reward W is based on the similarity between a musical sound V1 and a musical sound V2. The musical sound V1 is emitted from the percussion instrument 21 when it is struck by the striking member 22 that is driven in accordance with the control signal C. The musical sound V2 is emitted from the percussion instrument 21 when it is played in an exemplary manner (hereinafter referred to as the "exemplary musical performance"). The exemplary musical performance is, for example, a manual musical performance of a particular musical performer. The group of factors w for the learning model M is updated in such a manner as to maximize the reward W by allowing it to increase with an increase in the similarity between the frequency spectrum of the musical sound V1 generated by automatic musical performance and the frequency spectrum of the musical sound V2 generated during the exemplary musical performance. For a plurality of cases where the numerical values of a plurality of types of musical performance parameters P are different from each other, the group of factors w is repeatedly updated by using the musical sound V1 generated based on the musical performance parameters P. Each time the group of factors w is updated, the tone of a musical sound emitted from the percussion instrument 21 when the control signal C based on the time series of the instruction values for each musical performance parameter P is supplied to the drive mechanism 23 becomes closer to the tone of the musical sound V2 generated during the exemplary musical performance.

As is the case with the first embodiment, the second embodiment generates the learning model M by conducting machine learning upon receiving the input of a musical sound that is emitted from the percussion instrument 21 when it is struck by the striking member 22. Consequently, as is the case with the first embodiment, the second embodiment makes it possible to present a natural automatic musical performance of the percussion instrument 21 as compared to a case where the adopted configuration simply moves the striking member 22 in accordance with the music data D.

<Modifications>

Modified modes addable to modes exemplified above will now be described in detail. Two or more modes selected as appropriate from among the modes exemplified below may be combined as needed as far as they are consistent with each other.

(1) The types and the total number of musical performance parameters P are not limited to those exemplified above (start position P1, standby period P2, driving period P3, and release period P4). For example, the musical performance device 20 may be controlled by using three different musical performance parameters P (start position P1, standby period P2, and driving period P3) excluding the release period P4.

(2) In the foregoing embodiments, a drum is exemplified as the percussion instrument 21. However, the type of percussion instrument 21 targeted for automatic playing is not limited to the above-exemplified one. The foregoing embodiments are applied, for example, to timpani and other membranophones. Further, the percussion instrument 21 targeted for automatic playing is not limited to a membranophone. The foregoing embodiments are also applied, for example, to automatic playing of idiophones such as a xylophone or a metallophone. The name of the striking member 22 varies with the type of percussion instrument 21.

(3) In the foregoing embodiments, a vibration detector, for example, for a piezoelectric element and a sound collector for collecting a musical sound are exemplified as the detection device 30. However, the detection device 30 is not limited to the above-exemplified configuration. For example, an imager for capturing an image depicting how the striking member 22 strikes the percussion instrument 21 may be used as the detection device 30. The musical performance control sections 51 (the musical performance control section 51a and the musical performance control section 51b) identify the time point and the intensity of striking by the striking member 22 (e.g., the movement speed of the striking member 22) from video captured by the imager.

(4) For example, the following configurations are comprehended from the embodiment exemplified above.

The learning model generation method according to a preferred mode (mode 1) of the present disclosure strikes a percussion instrument with a striking member to emit a musical sound, conducts machine learning upon receiving an input of the musical sound emitted from the percussion instrument, and generates, based on the machine learning, a learning model for outputting numerical values for setting musical performance parameters for an automatic musical performance of the percussion instrument that is struck when the striking member is driven. The above mode conducts machine learning upon receiving the input of the musical sound that is emitted from the percussion instrument when it is struck by the striking member, and generates, based on the machine learning, a learning model for outputting the numerical values for setting the musical performance parameters for an automatic musical performance of the percussion instrument that is struck when the striking member is driven. Using the learning model generated in the above mode makes it possible to present a natural automatic musical performance of the percussion instrument as compared to a case where, for example, the adopted configuration simply moves the striking member in accordance with music data.

As exemplified in the following modes, the "numerical values for setting the musical performance parameters" include adjustment values for adjusting basic values (e.g., initial values) of the musical performance parameters as well as the numerical values of the musical performance parameters.

In a preferred example (mode 2) of mode 1, the machine learning is a process that uses an error in the musical sound emitted from the percussion instrument, and the learning model outputs, with respect to the error in the musical sound at one time point on a time axis, adjustment values for adjusting basic values of the musical performance parameters at an other time point later than the one time point. The above aspect, which uses the error in the musical sound for machine learning, provides an advantage that presents a natural automatic musical performance of the percussion instrument irrespective of changes in an environment where the percussion instrument is installed.

In a preferred example (mode 3) of mode 2, as regards each of a plurality of time points on the time axis and with respect to an error in a musical sound that is emitted in accordance with the basic values of the musical performance parameters at a specific time point and with adjustment values generated at the specific time point, the learning model outputs adjustment values for adjusting the basic values of the musical performance parameters at a time point later than the specific time point. The above mode generates a learning model that as regards each of a plurality of time points on the time axis, outputs adjustment values for adjusting the basic values of the musical performance parameters.

In a preferred example (mode 4) of mode 1, the machine learning is conducted to maximize a reward that is based on a similarity of frequency response between a musical sound emitted from the percussion instrument when an automatic musical performance is presented by driving the striking member and a musical sound generated during an exemplary musical performance, and the learning model outputs numerical values of musical performance parameters concerning the automatic musical performance. The above mode generates a learning model by conducting machine learning (more specifically, reinforcement learning) in such a manner as to maximize the reward that is based on the similarity of frequency response between a musical sound emitted from the percussion instrument when automatic musical performance is presented by driving the striking member and a musical sound generated during an exemplary musical performance. Consequently, the percussion instrument can be automatically played in such a manner as to emit a natural tone that is close to the tone of the musical sound generated during an exemplary musical performance.

The learning model generation device according to a preferred mode (mode 5) of the present disclosure includes: a musical performance control section that strikes a percussion instrument with a striking member to emit a musical sound; and a learning processing section that conducts machine learning upon receiving an input of the musical sound emitted from the percussion instrument, and generates, based on the machine learning, a learning model for outputting numerical values for setting musical performance parameters for an automatic musical performance of the percussion instrument that is struck when the striking member is driven. Using the learning model generated in the above mode makes it possible to present a natural automatic musical performance of the percussion instrument as compared to a case where, for example, the adopted configuration simply moves the striking member in accordance with music data.

The program according to a preferred mode (mode 6) of the present disclosure causes a computer to function as: a musical performance control section that strikes a percussion instrument with a striking member to emit a musical sound; and a learning processing section that conducts machine learning upon receiving an input of the musical sound emitted from the percussion instrument, and generates, based on the machine learning, a learning model for outputting numerical values for setting musical performance parameters for an automatic musical performance of the percussion instrument that is struck when the striking member is driven. The above mode conducts machine learning upon receiving the input of the musical sound emitted from the percussion instrument when it is struck by the striking member, and generates, based on the machine learning, a learning model for outputting numerical values for setting the musical performance parameters for an automatic musical performance of the percussion instrument that is struck when the striking member is driven. Using the learning model generated in the above mode makes it possible to present a natural automatic musical performance of the percussion instrument as compared to a case where, for example, the adopted configuration simply moves the striking member in accordance with music data.

The program according to mode 6 is supplied, for example, on a computer-readable recording medium and installed on the computer. The recording medium is, for example, a non-transitory recording medium. An optical recording medium (optical disk), such as a compact disc-read only memory (CD-ROM), is a good example of the recording medium. However, a semiconductor recording medium, a magnetic recording medium, or any other publicly-known recording media may alternatively be used as the recording medium. The non-transitory recording medium may be any recording medium except for a transitory propagating signal, and does not exclude a volatile recording medium. Further, the program may be supplied to the computer in the form of distribution through a communication network.

The automatic musical performance robot according to a preferred mode (mode 7) of the present disclosure automatically plays the percussion instrument by using the musical performance parameters outputted from the learning model that is generated when the computer executes a program according to any one of the foregoing modes. The above mode (mode 7) makes it possible to present a natural automatic musical performance of a percussion instrument.

It should be understood by those skilled in the art that various modifications, combinations, sub-combinations and alterations may occur depending on design requirements and other factors insofar as they are within the scope of the appended claims or the equivalents thereof.

What is claimed is:

1. A learning model generation method executed by a computer, comprising:
   storing basic values of musical performance parameters in a memory;
   striking a percussion instrument with a striking member to emit a musical sound;
   conducting machine learning upon receiving an input of the musical sound emitted from the percussion instrument, wherein the machine learning is based on an error in the musical sound; and
   generating, based on the machine learning, a learning model for outputting adjustment values for adjusting the stored basic values of the musical performance parameters for an automatic musical performance of the percussion instrument that is struck when the striking member is driven, wherein the learning model outputs, with respect to the error in the musical sound at a first time point on a time axis, the adjustment values for adjusting the stored basic values of the musical performance parameters at a second time point later than the first time point.

2. The learning model generation method according to claim 1, wherein, as regards each of a plurality of time points on the time axis and with respect to an error in a musical sound that is emitted in accordance with the basic values of the musical performance parameters at a specific time point of the plurality of time points and with adjustment values generated at the specific time point, the learning model further outputs adjustment values for adjusting the basic values of the musical performance parameters at a third time point of the plurality of time points later than the specific time point.

3. The learning model generation method according to claim 1, wherein
   the machine learning is conducted to maximize a reward that is based on a similarity of frequency response between a musical sound emitted from the percussion instrument when the automatic musical performance is presented by driving the striking member and a musical sound generated during an exemplary musical performance, and
   the learning model further outputs numerical values of the musical performance parameters concerning the automatic musical performance.

4. A learning model generation device, comprising:
   a memory configured to store basic values of musical performance parameters;
   a musical performance control section configured to strike a percussion instrument with a striking member to emit a musical sound; and a learning processing section configured to:
  conduct machine learning upon receiving an input of the musical sound emitted from the percussion instrument, wherein the machine learning is based on an error in the musical sound; and
  generate, based on the machine learning, a learning model to output adjustment values to adjust the stored basic values of the musical performance parameters for an automatic musical performance of the percussion instrument that is struck when the striking member is driven, wherein the learning model outputs, with respect to the error in the musical sound at a first time point on a time axis, the adjustment values to adjust the stored basic values of the musical performance parameters at a second time point later than the first time point.

5. The learning model generation device according to claim 4, wherein, as regards each of a plurality of time points on the time axis and with respect to an error in a musical sound that is emitted in accordance with the basic values of the musical performance parameters at a specific time point of the plurality of time points and with adjustment values generated at the specific time point, the learning model further outputs adjustment values to adjust the basic values of the musical performance parameters at a third time point of the plurality of time points later than the specific time point.

6. The learning model generation device according to claim 4, wherein
  the machine learning is conducted to maximize a reward that is based on a similarity of frequency response between a musical sound emitted from the percussion instrument when the automatic musical performance is presented by driving the striking member and a musical sound generated during an exemplary musical performance, and
  the learning model further outputs numerical values of the musical performance parameters concerning the automatic musical performance.

7. An automatic musical performance robot, comprising:
  a stick;
  a memory configured to store basic values of musical performance parameters; and
  an electronic controller including at least one processor, wherein the electronic controller is configured to execute a plurality of modules including
    a striking module configured to strike a percussion instrument with the stick to emit a musical sound; and
    a conducting machine learning module configured to:
      conduct machine learning upon receiving an input of the musical sound emitted from the percussion instrument, wherein the machine learning is based on an error in the musical sound; and
      generate, based on the machine learning, a learning model to output adjustment values to adjust the stored basic values of the musical performance parameters for an automatic musical performance of the percussion instrument that is struck when the stick is driven, wherein the learning model outputs, with respect to the error in the musical sound at a first time point on a time axis, the adjustment values to adjust the stored basic values of the musical performance parameters at a second time point later than the first time point.

8. The automatic musical performance robot according to claim 7, wherein, as regards each of a plurality of time points on the time axis and with respect to an error in a musical sound that is emitted in accordance with the basic values of the musical performance parameters at a specific time point of the plurality of time points and with adjustment values generated at the specific time point, the learning model further outputs adjustment values to adjust the basic values of the musical performance parameters at a third time point of the plurality of time points later than the specific time point.

9. The automatic musical performance robot according to claim 2, wherein
  the machine learning is conducted to maximize a reward that is based on a similarity of frequency response between a musical sound emitted from the percussion instrument when the automatic musical performance is presented by driving the stick and a musical sound generated during an exemplary musical performance, and
  the learning model further outputs numerical values of the musical performance parameters concerning the automatic musical performance.

* * * * *